United States Patent
Wong et al.

(10) Patent No.: US 7,216,923 B2
(45) Date of Patent: May 15, 2007

(54) SYSTEMS AND METHODS FOR REDUCING THE AERODYNAMIC DRAG ON VEHICLES

(75) Inventors: Alec S Wong, Bellevue, WA (US); Daniel Farmer, Coupeville, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 10/987,650

(22) Filed: Nov. 12, 2004

(65) Prior Publication Data
US 2006/0103167 A1 May 18, 2006

(51) Int. Cl.
*B62D 35/00* (2006.01)

(52) U.S. Cl. ............... 296/180.2; 296/180.4; 180/309; 180/903

(58) Field of Classification Search ............ 296/180.1, 296/180.2, 180.4; 180/309, 903
See application file for complete search history.

(56) References Cited

U.S. PATENT DOCUMENTS

| | | | |
|---|---|---|---|
| 2,101,793 A | 12/1937 | Field, Jr. | |
| 2,514,695 A * | 7/1950 | Dempsey | 296/208 |
| 3,425,740 A | 2/1969 | De Vaughn | |
| 3,697,120 A | 10/1972 | Saunders | |
| 3,711,146 A | 1/1973 | Madzsar et al. | |
| 3,834,752 A * | 9/1974 | Cook et al. | 180/309 |
| D238,161 S | 12/1975 | De Vaughn | |
| 3,952,823 A | 4/1976 | Hinderks | |
| 3,971,586 A | 7/1976 | Saunders | |
| 4,021,069 A | 5/1977 | Hersh | |
| 4,036,519 A | 7/1977 | Servais et al. | |
| 4,141,755 A | 2/1979 | Weiss et al. | |
| 4,143,731 A | 3/1979 | Haustein | |
| 4,210,354 A | 7/1980 | Canning | |
| 4,245,862 A | 1/1981 | Buckley, Jr. | |
| 4,257,640 A | 3/1981 | Wiley | |
| 4,343,506 A | 8/1982 | Saltzman | |
| 4,397,496 A | 8/1983 | Drygas, III | |
| 4,465,154 A | 8/1984 | Hinderks | |
| 4,611,847 A | 9/1986 | Sullivan | |
| 4,665,691 A | 5/1987 | Eller | |
| 4,904,015 A | 2/1990 | Haines | |
| 5,190,342 A | 3/1993 | Marlowe et al. | |
| 5,374,013 A | 12/1994 | Bassett et al. | |
| 5,658,038 A | 8/1997 | Griffin | |
| 5,863,090 A * | 1/1999 | Englar | 296/180.1 |
| 5,908,217 A | 6/1999 | Englar | |
| 6,286,894 B1 | 9/2001 | Kingham | |

FOREIGN PATENT DOCUMENTS

| | | | | |
|---|---|---|---|---|
| GB | 2068851 | * | 8/1981 | |
| SU | 839818 | * | 6/1981 | |
| SU | 895-783 | * | 1/1982 | 296/180.2 |

* cited by examiner

*Primary Examiner*—Dennis H. Pedder
(74) *Attorney, Agent, or Firm*—Christensen O'Connor Johnson Kindness PLLC (57) ABSTRACT

A drag reduction system introduces pressurized gases to selected regions of a vehicle, such as a tractor trailer combination 100 for reducing the aerodynamic drag thereon. The system 140 or any combination of components thereof may be installed on new combinations or may be retrofitted on existing combinations. The drag reduction system may be controlled to selectively determine which regions receive pressurized gases and at what flow rates such regions receive the pressurized gas.

16 Claims, 4 Drawing Sheets

SYSTEMS AND METHODS FOR REDUCING THE AERODYNAMIC DRAG ON VEHICLES

FIELD OF THE INVENTION

The present invention relates generally to systems and methods for reducing drag, and more particularly, to systems and methods for reducing drag on motor vehicles.

BACKGROUND OF THE INVENTION

Numerous means have been sought to improve the fuel-efficiency of moving bodies, and especially moving bluff bodies, by reducing their aerodynamic drag. In the field of surface transportation, and particularly in the long-haul trucking industry, even small improvements in fuel efficiency can reduce annual operating costs significantly. It is therefore advantageous in the design of a vehicle to reduce drag forces; thereby increasing the aerodynamic properties and efficiency of the vehicle.

Figure 1:
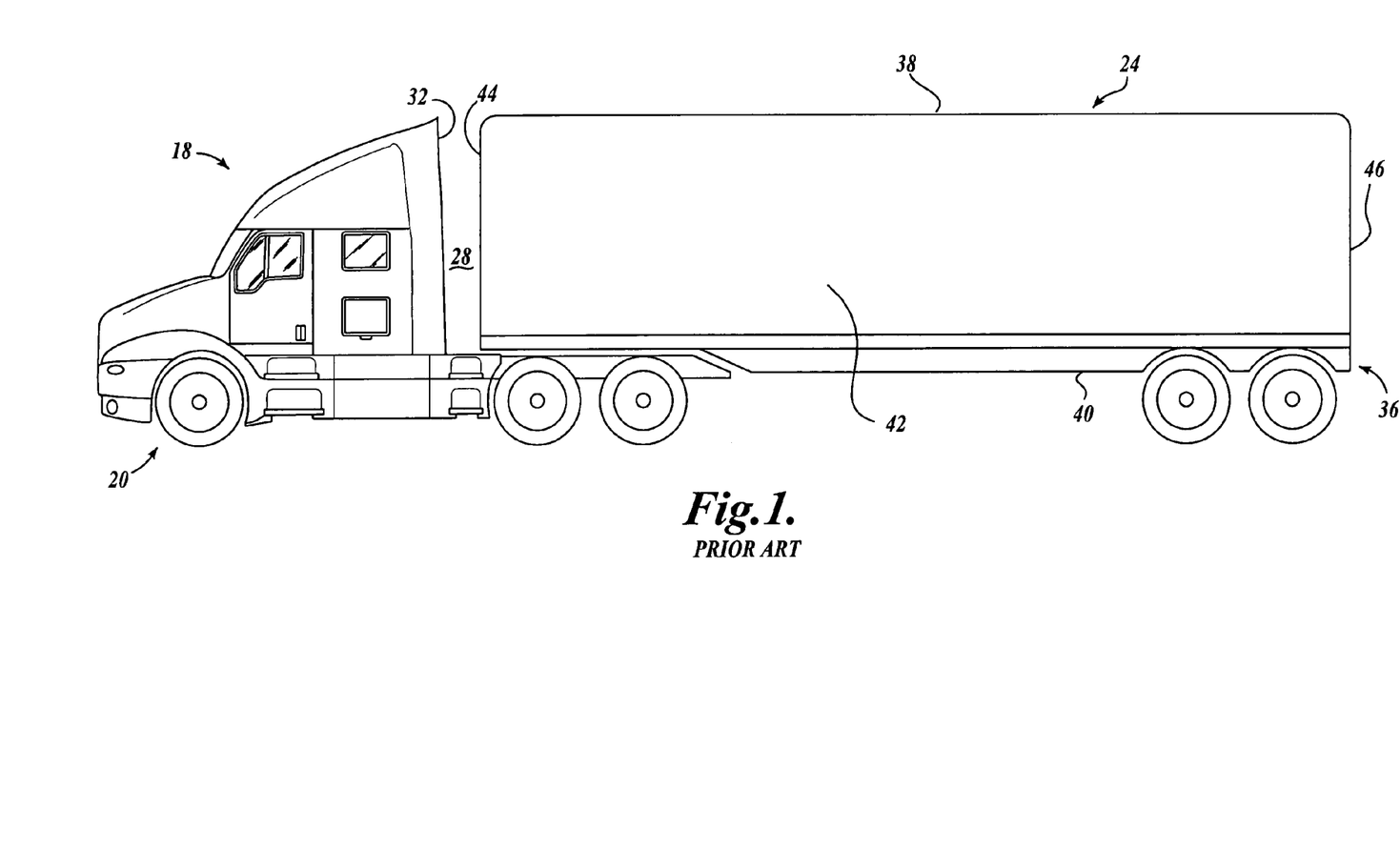
FIG. 1 is a side elevational view of a conventional tractor-trailer combination.

The over-the-highway cargo hauling tractor-trailer combination is one vehicle that experiences excessive aerodynamic drag. Generally described, tractor-trailer combinations 18 typically include a tractor 20 having a so-called fifth wheel by which a box-like semi-trailer 24 may be attached to the tractor 20 by an articulated connection for transportation of the semi-trailer 24, as shown in FIG. 1. By providing the articulated connection, a space or gap 28 is formed between the rear wall 32 of the tractor cab and the forward wall 44 of the semi-trailer 24. It is well known that this gap 28, or the gap between succeeding trailers (not shown) of a tractor trailer combination causes wake regions and, as a result, pressure drag.

Previous investigations of aerodynamic drag of tractor-trailer combinations resulted in widespread adoption of air deflectors mounted on tractor cabs and/or trailer bodies, and wholly redesigned tractors that utilize aerodynamic fairings to gradually increase the relatively small frontal area of the tractors to match, and to blend smoothly with, the larger cross-section of typical trailers, in an attempt to deflect air efficiently across the gap between cab assemblies and trailer bodies. Current air deflectors and fairings help guide the airstream around the front of tractor-trailer combinations and/or smooth the air flow over the gap between the articulated bodies, thereby reducing aerodynamic drag and improving fuel efficiency. Please see U.S. Pat. No. 4,021,069 to Hersh, U.S. Pat. No. 2,514,695 to Dempsey, U.S. Pat. No. 4,210,354 to Canning and U.S. Pat. No. 3,971,586 to Saunders, which are typical of trailer-mounted nose cone assemblies, and U.S. Pat. No. 4,245,862 to Buckley and U.S. Pat. No. 4,904,015 to Haines, which are typical of cab mounted deflectors or fairings. While in some instances these systems reduce the effective gap between bodies, such gap reduction is incidental and often there is still a significant amount of drag caused by the gap. Thus, aerodynamic drag reduction across the air gap between adjacent articulated tractor-trailer combination bodies is only partially achieved by fairings and deflectors.

Another approach, which has been the subject of numerous patents but has not been widely adopted in the trucking industry, is to attempt to span or seal the gap between vehicle bodies by fairings, panels, resilient bodies or the like. Please see U.S. Pat. Nos. 4,611,847, 4,397,496, 4,343,506, 4,141,755, 4,036,519, 3,834,752, 3,711,146, 3,425,740, 2,101,793 and D238,161, which disclose articulated tractor-trailer combinations having side and top structures that extend across the gap between the cab assembly and the trailer body to reduce the vehicle's aerodynamic drag.

These prior art mechanical gap-spanning systems, however, tend to suffer from problems of reliability and operating inconvenience. Some must be moved or removed to permit full relative articulation of the tractor-trailer bodies, while others often cannot reliably accommodate repeated articulation, particularly at large angles. Additionally, movable, inflatable and elastic panel systems, particularly if they require deployment controls, can add significantly to the cost of the tractor-trailer combination and they can be difficult to retro-fit to existing combinations. Such mechanical gap-spanning devices also often present problems when the trailer must be detached or separated from the tractor, which may be required several times a day in some applications.

Pressure drag on tractor-trailer combinations is not limited to the frontal area of the tractor and/or the gap disposed between the tractor and the articulating trailer. It is well known that the rear end of bluff bodies, such as trailers, are known to contribute significantly to aerodynamic drag as evidenced by the formation of a wake in the trailing region behind the trailer. The generation of the wake, formed by eddies can be contributed to the shape of the conventional trailer 24, which is essentially a rectangular box having a flat, rectangular roof 38 and matching floor 40, along with flat, rectangular side panels 42. The front and rear surfaces 44 and 46 of such trailers 24 are also generally flat rectangular surfaces. As such, current bluff bodies, such as trailers 24 suitable for use with tractors 20 of the Class 8 type, suffer from a low pressure zone at the rear 36 of the trailer 24 such that the airstream suffers from early separation, resulting in a broad eddying wake forming downstream of the separation. The net result is the creation of considerable aerodynamic drag.

Unfortunately, attempts to make the trailer shape more aerodynamic within the overall length of the trailer have been accompanied by reduced carrying capacity and interference during loading of the trailer. Additionally, attempts to make the rear of the trailer more aerodynamic, for example, by the addition of panels or inflatable bladders (not shown), can suffer from disadvantages such as added weight and a significant lengthening of the trailer, with associated reductions in fuel efficiency and more difficult handling characteristics.

SUMMARY OF THE INVENTION

In accordance with aspects of the present invention, a method is provided for installing a drag reduction system in a vehicle having front and rear ends and a source of exhausted gas. The method includes obtaining piping structure having an inlet port and at least one outlet port, connecting the inlet port of the piping structure in fluid communication with the source of exhausted gas, and positioning the output port of the piping structure such that gases from the source of exhausted gas are introduced to a region distal of the rear end of the vehicle.

In accordance with another aspect of the present invention, a method is provided for installing a drag reduction system in a trailer. The trailer includes a rear surface. The method includes obtaining piping structure having a first end defining an inlet port and a second end defining an outlet port. The first end of the piping structure include coupling structure adapted to be selectively coupled to a source of exhausted gases. The piping structure is mounted to the trailer; and the outlet port of the piping structure is positioned such that exhaustive gases supplied to the inlet port of the piping structure are introduced to a region located aft of the trailer rear surface.

In accordance with another aspect of the present invention, a method is provided for reducing the aerodynamic drag on a vehicle having a rear surface the method includes generating a source of pressurized exhaust gas; and introducing the exhaust gas at a position past the rear surface of the vehicle.

In accordance with another aspect of the present invention, a system is provided for reducing the aerodynamic drag on a vehicle having a rear end. The system includes a pressurized gas generation unit. The unit expels exhausted gas the system further includes piping structure defining an inlet and a discharge port. The inlet is connected in fluid communication with the pressurized gas generation unit to receive pressurized gas therefrom and the discharge port is positioned to introduce pressurized exhaust gas generated from the pressurized gas generation unit into a region positioned aft of the rear end of the vehicle.

In accordance with another aspect of the present invention, a trailer is provided, which includes a trailer body having a rear surface and piping structure extending along at least a portion of the trailer body. The piping structure is adapted to be selectively connected to a source of exhausted gases the trailer further includes at least one discharge port connected in fluid communication with the piping structure. The discharge port is positioned to discharge pressurized gas in the region trailing the trailer body rear surface.

In accordance with another aspect of the present invention, a vehicle is provided the vehicle includes a frame structure and an engine that generates exhaustive gases and propels the vehicle. The engine is carried by the frame structure. The vehicle also includes a cab assembly supported on the frame structure, wherein the cab assembly defines a rear surface. The vehicle further includes first piping structure connected in fluid communication with the engine for receiving generated exhausted gases and a discharge port connected in fluid communication with the piping structure. The discharge port is positioned to introduce exhaust gases in a region aft of the cab assembly rear surface.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENTS

The present invention will now be described with reference to the drawings where like numerals correspond to like elements. Embodiments of the present invention are directed to systems and methods for reducing the aerodynamic drag on vehicles, such as class 8 tractor-trailer combinations. Specifically, embodiments of the present invention are directed to systems and methods that utilize exhausted gases from an internal combustion engine of the combination for reducing the aerodynamic drag on vehicles. Although embodiments of the present invention will be described with reference to a Class 8 tractor-trailer combinations, one skilled in the relevant art will appreciate that the disclosed embodiments are illustrative in nature, and therefore, should not be construed as limited to application with a Class 8 tractor-trailer combination. It should therefore be apparent that the methods and systems of the present invention have wide application, and may be used in any situation where a reduction in the drag forces on a bluff body is desirable. It should be noted that for purposes of this disclosure, terminology such as "upper," "lower," "vertical," "horizontal," "fore," "aft," "inner," "outer," etc., should be construed as descriptive and not limiting. Accordingly, the following descriptions and illustrations herein should be considered illustrative in nature, and not limiting the scope of the present invention, as claimed.

Figure 2:
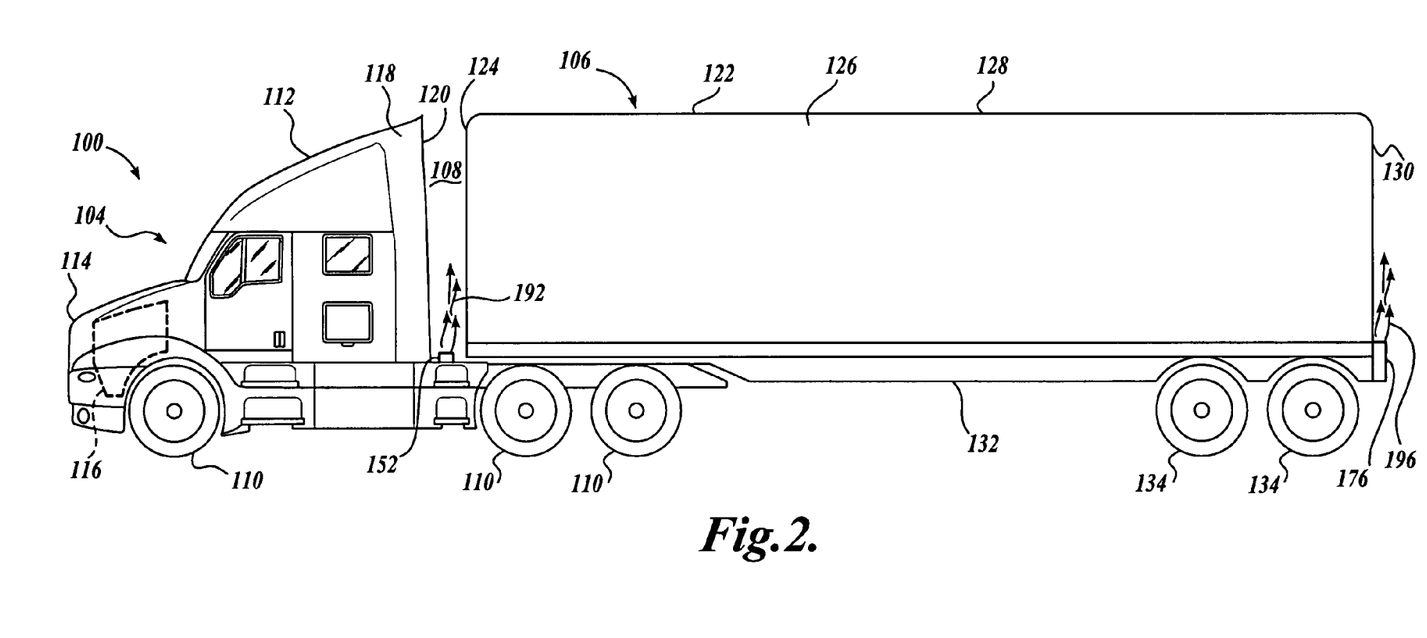
FIG. 2 is a side elevational view of a tractor-trailer combination incorporating a drag reduction system formed in accordance with aspects of the present invention.

FIG. 2 illustrates a tractor-trailer combination 100 incorporating one embodiment of a drag reduction system 140 (See FIG. 4) formed in accordance with aspects of the present invention. During use, the drag reduction system introduces pressurized gases to selected regions of the combination 100 for reducing the aerodynamic drag thereon. The system 140 or any combination of components hereinafter described may be installed on new combinations or may be retrofitted on existing combinations, as will be described in more detail below. Further, as will be described in detail below, the drag reduction system may be controlled to selectively determine which regions receive pressurized gases and at what flow rates such regions receive the pressurized gas.

As best shown in FIG. 2, the tractor-trailer combination 100 comprises a tractor 104 articulatedly connected to a trailer 106 by a so-called fifth wheel (not shown), the connection therebetween forming a space or gap 108. The tractor 104 comprises a chassis that is supported by wheels 110 connected thereto via conventional suspension assemblies (not shown). A conventional cab assembly 112 is supportably mounted on the chassis. The cab assembly 112 includes a front end 114 that generally houses an internal combustion engine 116 that propels the combination and a rear end 118 that defines a generally vertically oriented rear surface 120. The trailer 106 includes a trailer body 122 that is generally rectangular in shape having a forward panel 124, side panels 126, a top panel 128, a rear panel 130, and a bottom panel 132. The trailer body 122 is supportably mounted on sets of wheel assemblies 134.

As is typical of highway tractors, the cab assembly 112 may include a cab, sleeper box and various roof fairings, cab or sleeper box extenders, and side trim tabs, if desired, but not required to appreciate the benefits of the present invention. Collectively, however, these structures are referred to herein as the cab assembly or cab 112. It will be understood, however, that a myriad of possible combinations and cab shapes can comprise the cab assembly. As is known in the art, the tractor 104 may include fairings or cowls mounting to the front end 114 for improving the aerodynamics of the tractor 104, if desired.

Figure 4:
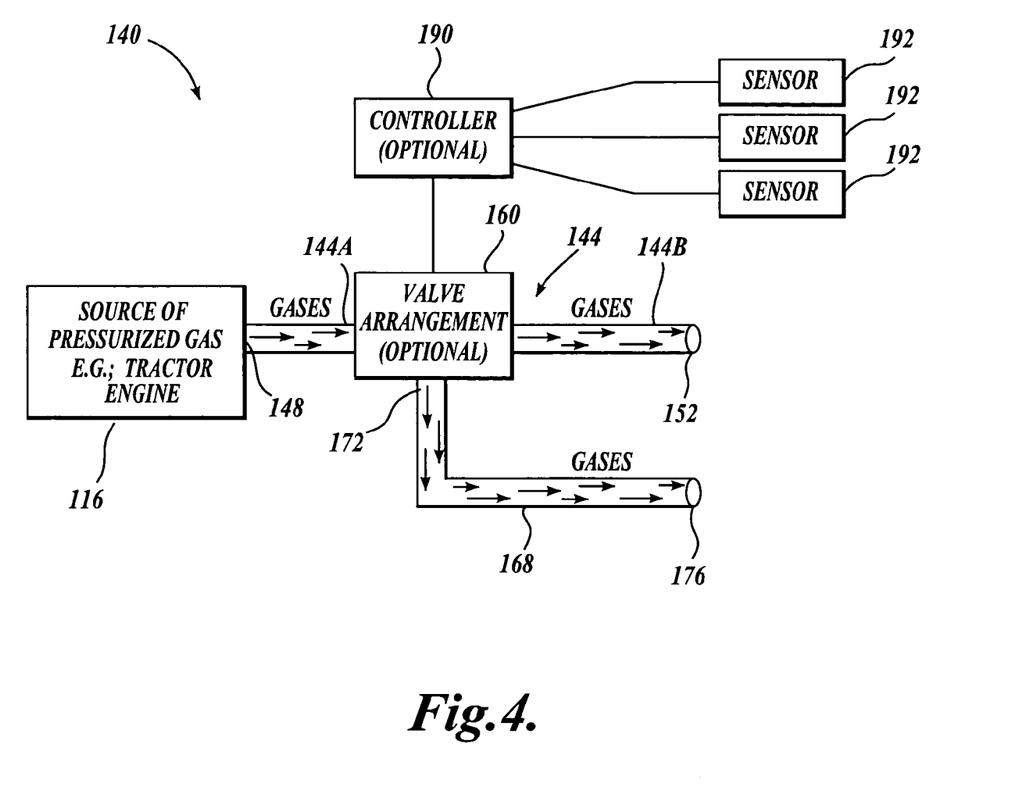
FIG. 4 is a schematic diagram of one embodiment of the drag reduction system formed in accordance with aspects of the present invention.

FIG. 4 is a schematic diagram of one embodiment of the drag reduction system 140 suitable for incorporation into the combination 100 (see FIG. 2) and capable of introducing pressurized exhaust gases to selected regions of the combination, for example, the gap 108 and region rear of the trailer 106. The system 140 includes tractor piping structure 144 defining an inlet port 148 and an outlet or discharge port 152. As best shown in FIG. 2, the discharge port 152 is configured and arranged for introducing pressured gas into the gap 108. In one embodiment, the discharge port 152 may be positioned at the lower region of the rear surface 120 of the cab assembly 112 or at the bottom of the gap 108. Preferably, the discharge port 152 introduces air into the gap 108 in an upward direction orthogonal to the longitudinal axis of the combination 100, although other angles of introduction are contemplated to be within the scope of the present invention. The inlet port 148 is connected in fluid communication to a source of pressurized gas, for example, the tractor engine 116 as shown schematically in FIG. 4. While one discharge port 152 is shown in the embodiment of FIG. 2, it will be appreciated that the tractor piping structure 144 may include a distribution manifold or plenum and other optional components for forming a plurality of spaced apart discharge ports (not shown).

In one embodiment, the system 140 may include a valve arrangement 160 operably connected in-between the inlet and discharge ports 148 and 152 of the tractor piping structure 144, if desired, for selectively determining the quantity of pressurized gas routed to the discharge port 152 and introduced into the gap 108. As such, the valve arrangement divides the tractor piping structure 144 into first and second piping structure segments 144A and 144B. The valve arrangement 160 may include one or more valves, such as solenoid valves, needle valves, etc., and associated components. The valve arrangement 160 can be manually controlled to determine the flow rate of gas introduction, or may be electrically controlled, as will be described in more detail below.

As was described above, the inlet port 148 is connected in fluid communication with the internal combustion engine 116 of the tractor 104. In one embodiment, the inlet port 148 of the tractor piping structure 144 may be connected to the exhaust manifold, exhaust piping, or exhaust passageway of the engine 116 in any manner known in the art so that exhausted gases generated by the engine 116 are supplied to the discharge port 152 through the tractor piping structure 144. Alternatively, the tractor piping structure 144 may include structure, such as an exhaust manifold, etc., so that the tractor piping structure 144 can connect directly to the engine 116 for receiving gas therefrom. In one embodiment of the present invention, the valve arrangement 160 may be configured and controlled such that gas exhausted from the engine 116 partially or fully by-passes the discharge port 152 and is vented to atmosphere, for example, through a conventional exhaust pipe stack or other exhaust piping structure (not shown).

Still referring to FIG. 4, the system 140 may further include additional structure for introducing pressurized gas to the region trailing the rear panel 130 of the trailer 106. In one embodiment, the additional structure includes a trailer piping structure 168 that defines an inlet port 172 and at least one outlet or discharge port 176. The inlet port 172 is adapted to connect to a source of pressurized exhaust gas as will be described in detail below. The trailer discharge port 176 is configured and arranged to introduce pressured exhaust gas to the region trailing the rear panel 130 of the trailer 106. Preferably, the discharge port 176 introduces air into the region trailing the trailer 106 in an upward direction orthogonal to the longitudinal axis of the combination 100, although other angles of introduction are contemplated to be within the scope of the present invention. In one embodiment, the discharge port 176 may be positioned adjacent the lower rear region of the trailer rear panel 130. Preferably, the trailer piping structure 168 defines two or more outlet ports 176, as shown in FIG. 3.

In the embodiment illustrated in FIG. 4, the inlet port 172 of the tractor piping structure 168 is connected in fluid communication to a source of pressurized gas, for example, the engine 116, through the valve arrangement 160. As such, it will be appreciated that the valve arrangement 160 may include any number and/or types of valves in any known configuration to selectively supply gas to the tractor discharge port 152 positioned in the gap 108 and/or trailer discharge port 176 located at the rear of the trailer 106. Alternatively, the inlet port 172 of the trailer piping structure 168 may be adapted to connect directly or indirectly to the engine 116 or any other pressurized gas generating source carried by either the tractor 104 or the trailer 106. Other configurations of the system 140 are contemplated to be within the scope of the present invention. For example, the system 140 may include piping structure 144 and 168 but omit the valve arrangement 160. As such, in this embodiment, the tractor and trailer discharge ports 152 and 176 will receive pressurized gas as long as the engine 116 or other source of pressurized gases is operating.

Figure 3:
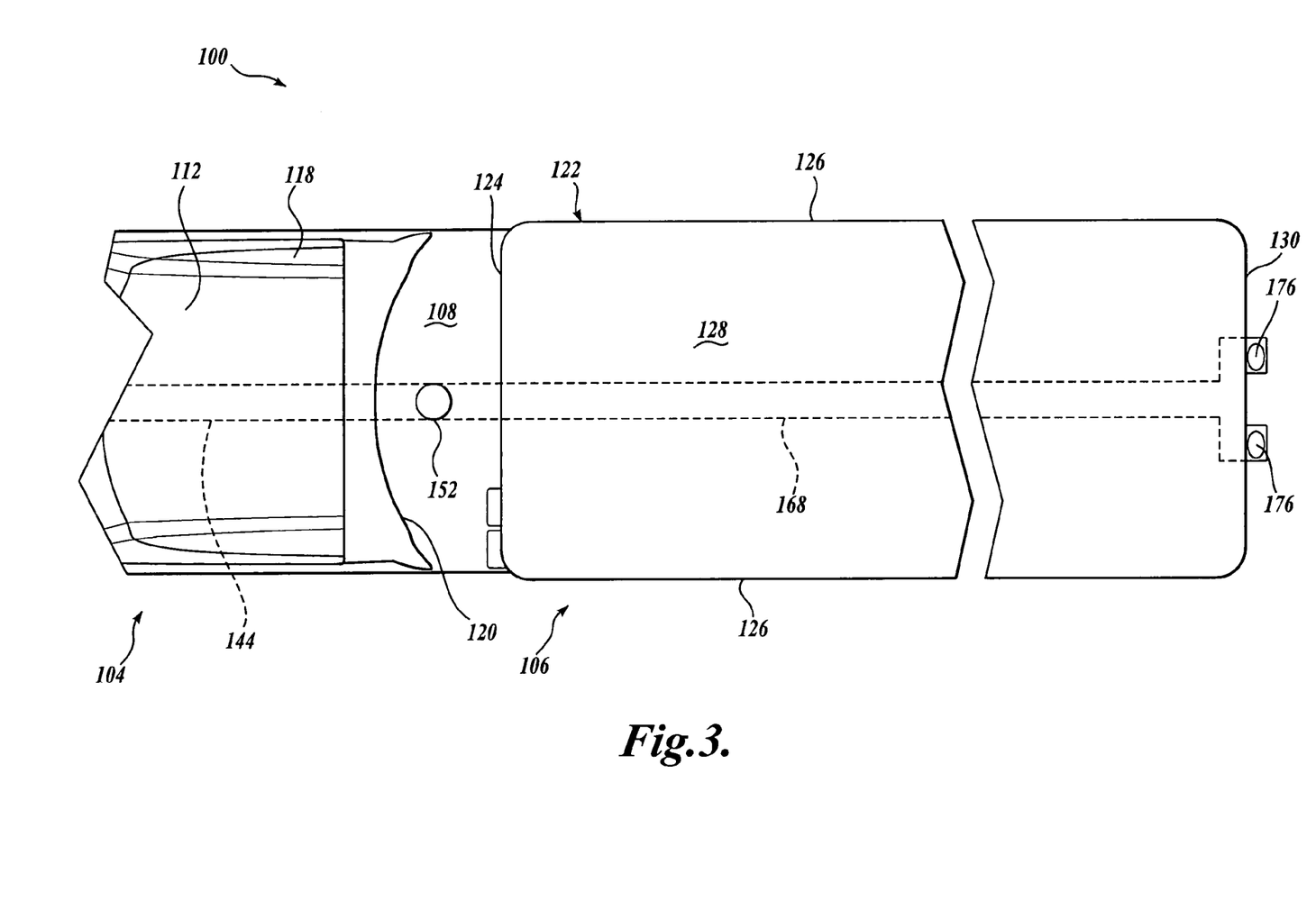
FIG. 3 is a partial top view of the tractor trailer of FIG. 2.
Figure 5:
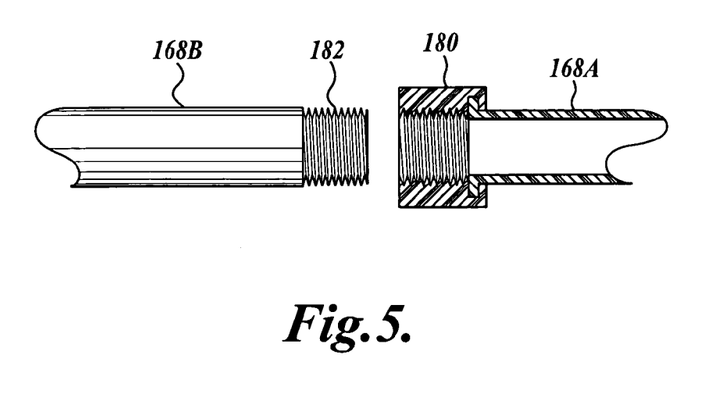
FIG. 5 is one suitable embodiment of a coupling device that may be utilized by the drag reduction system.

As best shown in FIG. 3, the trailer piping structure 168 may be routed along the bottom panel of the trailer 106. Alternatively, the trailer piping structure 168 may be routed along the edge of the trailer 106 to the front panel 124 of the trailer 106 (not shown). Since the trailer 106 is unhooked from the tractor 104 frequently, the trailer piping structure 168 is preferably formed by first and second segments 168A and 168B, as shown in FIG. 5. The first segment 168A of the trailer piping structure 168 preferably includes first coupling structure 180 configured to be selectively coupled to a second segment 168B of the trailer piping structure 168. At one end, the second segment 168B of the trailer piping structure 168 is operably connected in fluid communication with a source of pressurized gas, for example, the engine 116. At the other end, the second segment 168B of trailer piping structure 168 includes a second coupling structure 182 configured to cooperatively connect to the first coupling structure 180, preferably in a substantially sealed manner, as best shown in FIG. 5. Such cooperating coupling structure 180 and 182 is well known in the art and may include, for example, threaded connectors, quick connectors, clamped or bolted flanges, etc., and thus will not be described in detail here. In the embodiment shown, the first and second segments 168A and 168B are detachably connected using threaded connectors known in the art. As such, when the trailer 106 requires to be unhooked and/or swapped with another trailer 106, the first and second segments 168A and 168B may be decoupled easily and effectively. In one embodiment, the opposite end of the second segment 168B of trailer piping structure 168 is connected in fluid communication to the valve arrangement 160 for selectively receiving exhausted gases from the internal combustion engine 116.

As was described above, the valve arrangement 160 may be electrically controlled by an optional controller 190 shown schematically in FIG. 4. The controller 190 is connected in electrical communication with the valve arrangement 160 and other components, for example, sensors 192, as will be described in detail below. The controller 190 may include a logic system for determining the operation of the valve arrangement 160, which may be determined for each distinct application. It will be appreciated by one skilled in the art that the logic may be implemented in a variety of configurations, including but not limited to, analog circuitry, digital circuitry, processing units, and the like.

In one embodiment, the controller 190 may include a processing unit, a memory, and input/output (I/O) circuitry connected in a conventional manner. The memory may include random access memory (RAM), read only memory (ROM), or any other type of digital data storage means. The I/O circuitry may include conventional buffers, drivers, relays and the like, for sending device appropriate signals to the valves of the valve arrangement 160.

The sensors 192 are connected to the controller 190 each outputting a signal to the controller 190 indicative of an operating parameter of the combination 100. For example, the sensors 192 may include an engine speed sensor for sensing engine speed, a throttle position sensor for sensing the position of the throttle valve, and/or an accelerometer for sensing the acceleration of the tractor and/or combination, etc. The information from these sensors 192 may be utilized by the controller 190 to control the operation of the valve arrangement 160. For example, the controller 190 may operate the valve arrangement 160 to supply exhaust gas to the tractor discharge port 152 and/or the trailer discharge port 176 when, for example, the combination 100 has reached a threshold speed (e.g., 10 mph) and/or when, for example, the combination 100 is accelerating greater than a certain threshold amount. The controller 190 may also operate the valve arrangement 160 to terminate the supply of exhaust gas to the discharge port when, for example, the combination is idling. It will be appreciated that the controller 190 may comprise a separate processing unit dedicated to the valve arrangement 160, or may comprise an existing on-board processor, such as the engine control unit (ECU), that performs other functions in the operation of the tractor 104.

In another embodiment of the system 140, one of the sensors 192 may be a brake sensor for sensing the application of brakes. In this embodiment, the system 140 would discontinue or reduce the introduction of exhausted gases through discharge ports 152 and/or 176 when the brakes of the tractor 104 are applied so as to increase the amount of resistance (drag) against the forward motion of the tractor 104, thereby improving the braking ability of the tractor 104. It will be appreciated that other ways in which the system 140 may be controlled will readily be apparent to those skilled in the art and, accordingly, will not be described in any further detail.

The operational effects of the system 140 described herein will know be described in detail with reference to FIGS. 2–4. To appreciated the benefits of the system 140 of the present invention, the effects of an airstream on a conventional tractor-trailer combination (i.e., one that does not include the systems and methods of the present) will first be described. Turning now to FIG. 1, there is shown a conventional tractor-trailer combination 18. During operation, as the conventional tractor-trailer combination 18 moves in a forward direction, the tractor-trailer combination 18, as was described above, encounters an airstream (not shown). It will be appreciated that for purposes of the present aerodynamic discussion, the combination's forward motion at highway speeds is equivalent to an airstream having a similar but opposite velocity flowing over a stationary combination.

The airstream encounters the front region of the tractor 20 and proceeds along the cab and across the gap 28. As the airstream flows across the gap 28, areas of low pressure develop in the gap 28 by the separation of air flow of the airstream between the tractor 20 and the trailer 24. The separation of the airstream forms a wake region of eddies located aft of the trailing edges of the cab assembly, which in turn, results in increased drag against the combination.

As the airstream continues to flow past the gap 28 and along the trailer body, the airstream encounters another region of low pressure located behind the rear panel 46, causing continuous separation of air flow at the trailing edges of the trailer 24, and thus, pressure drag against the forward movement of the trailer 24. The region of low pressure forms because the airstream along the trailer body cannot navigate the sharp change in direction and velocity required to negotiate the vertical rear panel 46, resulting in flow separation at the trailing edges of the trailer 24. The flow separation causes the velocity of the air behind the rear panel 46 to increase, and as a result, causes eddy formation and a lower pressure region to form. The flow separation and eddy formation causes pressure drag.

In contrast with the conventional combination, when an airstream encounters the combination 100 incorporating the drag reduction system 140 shown best in FIGS. 2 and 3, a reduction in pressure drag is achieved for the following reasons. As the combination 100 moves forward, exhausted gases, shown generally as arrows 192, generated from the engine 116 are introduced into the gap 108 formed between the rear surface 120 of the cab assembly 112 and the front panel 124 of the trailer 122. The introduced exhausted gases increase the local pressure in the gap region, thereby decreasing the pressure gradient between the gap region and at the surfaces of the cab assembly 112 located at the trailing edges thereof. By lowering the pressure gradient, the formation of eddies decreases, and thus, the drag on the tractor 104 decreases.

As the airstream continues to flow past the gap 108 and along the body 122 of the trailer 106, exhaust gases, shown generally as arrows 196, are introduced simultaneously into the region trailing the rear panel 130 from the discharge ports 176. The introduced exhaust gases, in effect, increase the local pressure behind the rear of the trailer 126, and thus, acts to generate an invisible afterbody or "pressure shell". The so called "pressure shell" delays the separation of the airstream flowing past the trailing edges of the trailer body 122, thus reducing the formation of turbulent wakes. A reduction in turbulent wakes in the trailing region of the trailer 106 results in a decrease in pressure drag against the combination 100.

It will be appreciated that various components of the system 140 may be sold as a kit for installation on new vehicles built at the factory, for after-market shops that receive the combinations from the factory, or for retrofitting existing vehicles that desire the benefits of the systems and methods described herein. Additionally, it will be appreciated that the piping structure may be any light-weight flexible tubing or rigid or semi-rigid conduit known in the art or combinations thereof. Each piping structure may be one or multiple sections interconnected through components well know in the art.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of installing a drag reduction system in a vehicle that is mateable to a trailer, the vehicle having a cab with a cab front surface and a cab rear surface and a source of exhausted gas, the method comprising:
    obtaining a first piping structure having an inlet port and at least one outlet port;
    connecting the inlet port of the first piping structure in fluid communication with the source of exhausted gas; and
    positioning at least one outlet port of the first piping structure distal of the cab rear surface, and in a gap defined between the cab rear surface and the trailer when a trailer is coupled to the cab, the gap being open to the atmosphere, wherein the at least one outlet port is positioned vertically such that air is discharged into the gap in solely a vertical direction.

2. A method for reducing the aerodynamic drag on a vehicle that is mateable to a trailer, the vehicle having a cab with a cab rear surface, the method comprising:
    generating a source of pressurized exhaust gas; and
    introducing the exhaust gas solely in a vertical direction at a position past the cab rear surface of the vehicle, and in a gap defined by the cab rear surface of the vehicle and the trailer when the trailer is coupled to the vehicle, the gap being open to the atmosphere.

3. The method of claim 2, wherein the pressurized exhaust gas is generated from a vehicle engine.

4. The method of claim 3, wherein the introduction of the exhaust gas is selectively controlled.

5. A system for reducing the aerodynamic drag on a vehicle that is mateable to a trailer, the vehicle having a cab with a cab rear surface, the system comprising:
    a pressurized gas generation unit, the unit expelling exhausted gas; and
    piping structure defining an inlet and a discharge port, the inlet being connected in fluid communication with the pressurized gas generation unit to receive pressurized gas therefrom and the discharge port being positioned vertically in a gap defined by the cab rear surface and the trailer when the trailer is coupled to the vehicle, the gap being open to the atmosphere, such that air is discharged into the gap in solely a vertical direction.

6. The system of claim 5, further comprising at least one valve positioned between the inlet and the discharge port of the piping structure, the valve capable of selectively supplying pressurized gas to the discharge port.

7. The system of claim 6, wherein the valve is either manually or electrically controlled.

8. The system of claim 7, further comprising a controller operably connected to the valve, the controller capable of controlling the operation of the valve.

9. The system of claim 8, further including at least one sensor connected in communication with the controller, the sensor capable of generating a signal, the controller controlling the valve in response to the signal generated by the sensor.

10. The system of claim 9, wherein the at least one sensor is selected from a group consisting of a speed sensor, a throttle position sensor, a brake sensor, and an accelerometer.

11. A vehicle mateable to a trailer, the vehicle comprising:
    a frame structure;
    an engine that generates exhaust gases and propels the vehicle, the engine being carried by the frame structure;
    a cab assembly supported on the frame structure, the cab assembly defining a cab rear surface;
    first piping structure connected in fluid communication with the engine for receiving generated exhaust gases; and
    a first discharge port connected in fluid communication with the first piping structure, the first discharge port open to the atmosphere and positioned vertically to introduce exhaust gases solely in a vertical direction in a region aft of the gap defined by the cab assembly rear surface and the trailer when the vehicle is coupled to the trailer.

12. The vehicle of claim 11, further comprising a trailer connected to the frame structure, the trailer having a front surface and a rear surface, the front surface positioned a spaced distance from the rear surface of the cab assembly thereby forming a gap.

13. The vehicle of claim 12, further comprising second piping structure connected in fluid communication with the engine for receiving generated exhausted gases and distributing the generated exhausted gases aft of the rear surface of the trailer.

14. The vehicle of claim 12, further comprising:
    a second piping structure extending along at least a portion of the trailer the second piping structure including a coupling structure for selectively coupling the second piping structure to the engine when the trailer is coupled to a vehicle, and for selectively decoupling the second piping structure from the engine when the trailer is disconnected from a vehicle; and
    a second discharge port connected in fluid communication with the piping structure, the second discharge port positioned to discharge pressurized gas in the region trailing the trailer rear surface.

15. The method of claim 1, further comprising:
    obtaining a second piping structure having a first end defining an inlet port and a second end defining at least one outlet port, the first end of the second piping structure including a coupling structure for selectively coupling the second piping structure to the source of exhausted gases when the trailer is coupled to the vehicle, and for selectively decoupling the second piping structure from the source of exhausted gases when the trailer is disconnected from the vehicle;
    mounting the second piping structure to the trailer; and
    positioning the at least one outlet port of the second piping structure such that exhausted gases supplied to the inlet port of the second piping structure are introduced to a region located aft of the trailer rear surface.

16. The method of claim 15, wherein the second piping structure includes a plurality of outlet ports, each spaced apart a selected distance.

* * * * *

UNITED STATES PATENT AND TRADEMARK OFFICE
CERTIFICATE OF CORRECTION

| | | |
|---|---|---|
| PATENT NO. | : 7,216,923 B2 | Page 1 of 1 |
| APPLICATION NO. | : 10/987650 | |
| DATED | : May 15, 2007 | |
| INVENTOR(S) | : A.C. Wong et al. | |

It is certified that error appears in the above-identified patent and that said Letters Patent is hereby corrected as shown below:

COLUMN      LINE

On the title page, item:
   (75)     Inventors     "Alec S Wong," should read --Alec C. Wong,--
Pg. 1, col. 1

10           32        after "trailer" insert --,--
(Claim 14,    line 3)

Signed and Sealed this

Sixth Day of November, 2007

JON W. DUDAS
*Director of the United States Patent and Trademark Office*